(12) United States Patent
Lee et al.

(10) Patent No.: US 11,577,277 B2
(45) Date of Patent: Feb. 14, 2023

(54) GLASS WOOL CUTTING DEVICE AND METHOD FOR MANUFACTURING GLASS WOOL PELLET USING THE SAME

(71) Applicants: Hyundai Motor Company, Seoul (KR); Kia Motors Corporation, Seoul (KR); Dae Ha Co., Ltd., Chungcheongnam-do (KR)

(72) Inventors: Han Ki Lee, Seoul (KR); Mun Gyu Bak, Seoul (KR); Hak Soo Kim, Gyeonggi-Do (KR); Ju Seong Park, Gyeonggi-Do (KR); A Rom Oh, Seoul (KR); Seung Chan Baek, Gyeonggi-Do (KR); Song Woo Nam, Daejeon (KR); Ju Hong Kim, Chungcheongnam-Do (KR)

(73) Assignees: Hyundai Motor Company, Seoul (KR); Kia Motors Corporation, Seoul (KR); Dae Ha Co., LTD., Dangjin (KR)

( * ) Notice: Subject to any disclaimer, the term of this patent is extended or adjusted under 35 U.S.C. 154(b) by 1129 days.

(21) Appl. No.: 16/165,651

(22) Filed: Oct. 19, 2018

(65) Prior Publication Data
US 2019/0292091 A1  Sep. 26, 2019

(30) Foreign Application Priority Data
Mar. 21, 2018  (KR) .................. 10-2018-0032414

(51) Int. Cl.
*B02C 18/14* (2006.01)
*B02C 23/24* (2006.01)
(Continued)

(52) U.S. Cl.
CPC .................. *B07B 1/28* (2013.01); *B07B 1/36* (2013.01); *D04H 1/4218* (2013.01); *D04H 1/44* (2013.01);
(Continued)

(58) Field of Classification Search
CPC .... B07B 1/00; B07B 1/28; B07B 1/36; B07B 2201/04; B07B 9/00; B07B 13/04;
(Continued)

(56) References Cited

U.S. PATENT DOCUMENTS 8,919,683 B2 * 12/2014  Kim .................... B02C 19/0056
241/243
2011/0232839 A1 * 9/2011  Krumm ................... B02C 18/24
83/14

FOREIGN PATENT DOCUMENTS

CA  2125744 C  3/1999
CN  1076153 A  9/1993
(Continued)

*Primary Examiner* — Gene O Crawford
*Assistant Examiner* — Muhammad Awais
(74) *Attorney, Agent, or Firm* — Fox Rothschild LLP (57) ABSTRACT

The present invention provides a glass wool cutting device. The device includes a cutting section housing that has a cutting section chamber, a feed port that is connected to the cutting section chamber, and a discharge port that is connected to the cutting section chamber. A stationary knife is disposed on the cutting section housing to protrude into the cutting section chamber and a movable cutter that has a rotary support body is disposed in the cutting section chamber and a movable knife is supported on the rotary support body to apply a shearing force to the glass wool together with the stationary knife. Additionally, a cutter actuator provides a driving force to the rotary support body.

18 Claims, 7 Drawing Sheets

(51) Int. Cl.
  *B02C 18/18* (2006.01)
  *B07B 1/28* (2006.01)
  *D04H 1/4218* (2012.01)
  *B07B 1/36* (2006.01)
  *D04H 1/44* (2006.01)
  *B02C 18/22* (2006.01)
  *B02C 23/10* (2006.01)
  *B02C 23/14* (2006.01)

(52) U.S. Cl.
  CPC ........ *B02C 18/145* (2013.01); *B02C 18/2241* (2013.01); *B02C 23/10* (2013.01); *B02C 23/14* (2013.01); *B02C 23/24* (2013.01); *B02C 2018/188* (2013.01); *B07B 2201/04* (2013.01); *D10B 2505/02* (2013.01)

(58) Field of Classification Search
  CPC ...... D04H 1/4218; D04H 1/44; B02C 18/145; B02C 18/146; B02C 18/2241; B02C 23/10; B02C 23/14; B02C 23/24; B02C 2018/188; D10B 2505/02; C03B 37/16; B26D 1/38; B26D 1/0006; B26D 7/06; B26D 7/0641; B26D 7/2614; B26D 7/27; B26D 7/32; B26D 7/08; B26D 2001/0053; B26D 2001/0066; B26D 2007/0018

See application file for complete search history.

(56) References Cited

FOREIGN PATENT DOCUMENTS

| | | | | |
|---|---|---|---|---|
| CN | 201384974 Y | * | 1/2010 | |
| CN | 201384974 Y | | 1/2010 | |
| CN | 102917800 A | | 2/2013 | |
| CN | 205599277 U | | 9/2016 | |
| CN | 205599277 U | * | 9/2016 | |
| CN | 206510274 U | | 9/2017 | |
| CN | 107812583 A | * | 3/2018 | |
| DE | 102011016658 A1 | | 10/2012 | |
| FR | 2847249 A1 | * | 5/2004 | ............ C03B 37/16 |
| KR | 10-1114966 B1 | | 2/2012 | |
| KR | 10-2014-0000013 A | | 1/2014 | |
| KR | 20140000013 A | * | 1/2014 | |

* cited by examiner

GLASS WOOL CUTTING DEVICE AND METHOD FOR MANUFACTURING GLASS WOOL PELLET USING THE SAME

CROSS-REFERENCE TO RELATED APPLICATION

This application claims priority to Korean Patent Application No. 10-2018-0032414 filed on Mar. 21, 2018, the entire contents of which are incorporated herein by reference.

BACKGROUND

(a) Technical Field

The present invention relates to a glass wool cutting device and a method for manufacturing a glass wool pellet using the same, and more particularly, to a glass wool cutting device capable of cutting a glass wool into glass wools having a size that may be employed as a reinforcement of a composite material, and to a method for manufacturing a glass wool pellet using the same.

(b) Background Art

Generally, a composite material refers to a material obtained by combining two or more types of materials having different compositions or shapes to have an interface that macroscopically separates the materials from each other, and thereby having an effective function. The composite material includes reinforcement and matrix as components, and the composite material with these components may be generally classified into a layered composite material, a particle reinforced composite material, and a fiber reinforced composite material.

Characteristics of the composite material that can be improved, may include strength and stiffness, corrosion resistance, fatigue lifespan, abrasion resistance, impact characteristics, heat resistance, electrical insulation, heat insulation, weight reduction, appearance, and the like. However, not all of the composite materials are improved to have the above-mentioned characteristics at the same time, and the necessary properties may be given differently depending on the type of reinforcement and matrix. Recently, the most noticeable characteristics of composite material for being regarded as new material may be strength-to-weight ratio and stiffness.

A glass wool is a material that can be employed as a reinforcement of composite material, and the glass wool is made by extracting a low-melting-point glass having a substantial amount of soda component into a fiber form. The glass wool has heat resistance and high tensile strength, has excellent electrical properties, and may be employed as a heat insulating material, a refractory material, a filter material, and an electrical insulation material, and the like. Furthermore, the glass wool is excellent in heat insulation and sound absorption, and it is non-flammable since it is an inorganic component, and there is little or no deformation with time, and thus it can be semi-permanently used.

However, although the glass wool has been mainly manufactured and used as a building material in the form of rolls, mats and slabs, there is also a drawback in that the glass wool produced in the form of rolls, mats, and slabs are difficult to use as a reinforcement of composite material.

The above information disclosed in this section is merely for enhancement of understanding of the background of the invention and therefore it may contain information that does not form the prior art that is already known in this country to a person of ordinary skill in the art.

SUMMARY

The present invention provides a glass wool cutting device capable of more easily cutting a glass wool into glass wools having a size that may be efficiently used as a reinforcement of a composite material, and a method of manufacturing a glass wool pellet using the same. Other objects which are not mentioned herein will be apparent to those skilled in the art from the following description.

To achieve the above-described object, an exemplary embodiment of the present invention provides a glass wool cutting device that may include a cutting section housing having a cutting section chamber, a feed port connected to the cutting section chamber to feed a glass wool into the cutting section chamber, and a discharge port having a size smaller than a size of the feed port and connected to the cutting section chamber to discharge the glass wool from the cutting section chamber. The glass wool cutting device may further include a stationary knife fixedly disposed on an inner surface of the cutting section housing to protrude into the cutting section chamber; a movable cutter having a rotary support body rotatably disposed in the cutting section chamber and a movable knife supported on the rotary support body to apply a shearing force to the glass wool, which is fed into the cutting section chamber, together with the stationary knife and to cut the glass wool; and a cutter actuator configured to provide a driving force to the rotary support body.

To achieve the above-described object, the present invention also provides a method for manufacturing a glass wool pellet. The method may include feeding a glass wool into a cutting section housing having a cutting section chamber and a discharge port; applying a shearing force to and cutting the glass wool fed into the cutting section chamber with a stationary knife, which is disposed and protrudes on an inner surface the cutting section housing, and a movable knife while rotating the movable knife disposed in the cutting section chamber; and sorting the glass wool having a size equal to or less than a predetermined size, which are cut by the stationary knife and the movable knife and discharged from the discharge port, as a glass wool pellet.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other exemplary embodiments, which may be included within the spirit and scope of the invention as defined by the appended claims.

Hereinafter, exemplary embodiments of the present invention will be described in detail with reference to the accompanying drawings to allow those skilled in the art to which the present invention pertains to carry out the present invention. In addition, since the present invention may be implemented in various forms, the present invention is not limited to the exemplary embodiments described herein. To clearly describe the present invention, parts which are not related to the description may be omitted, and the same reference numerals are used for indicating the same or similar components throughout the drawings and detail description.

Figure 1:
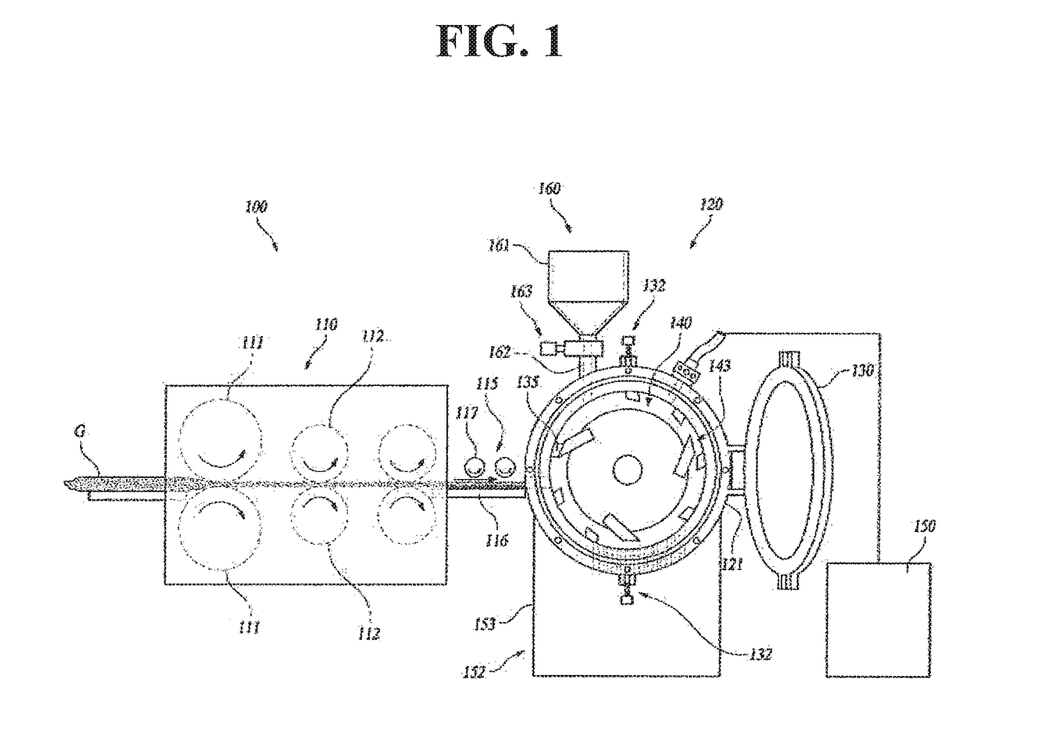
FIG. 1 is a front view schematically showing a glass wool cutting device according to one exemplary embodiment of the present invention.
Figure 2:
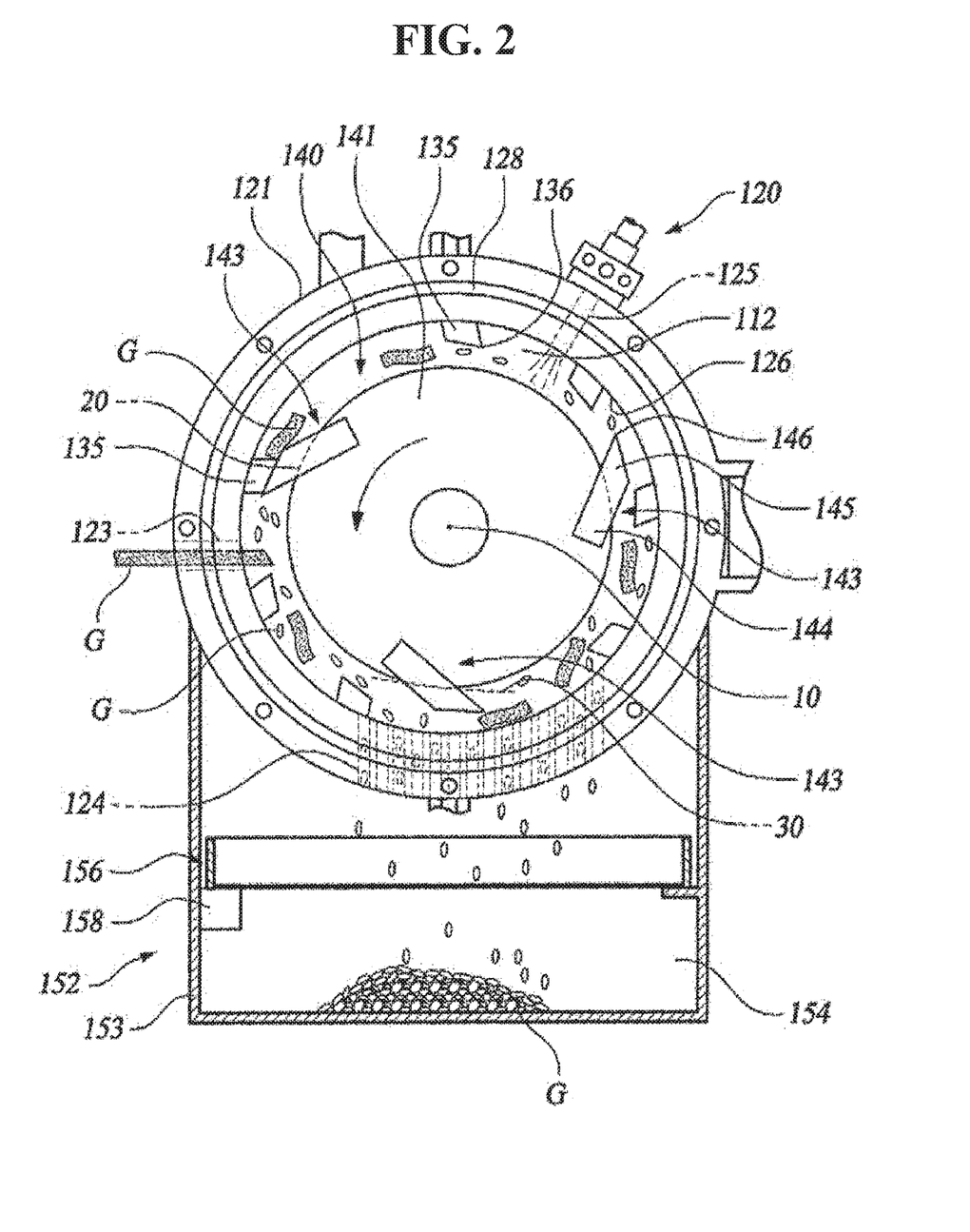
FIGS. 2 and 3 show a part of configuration of the glass wool cutting device according to one exemplary embodiment of the present invention.
Figure 4:
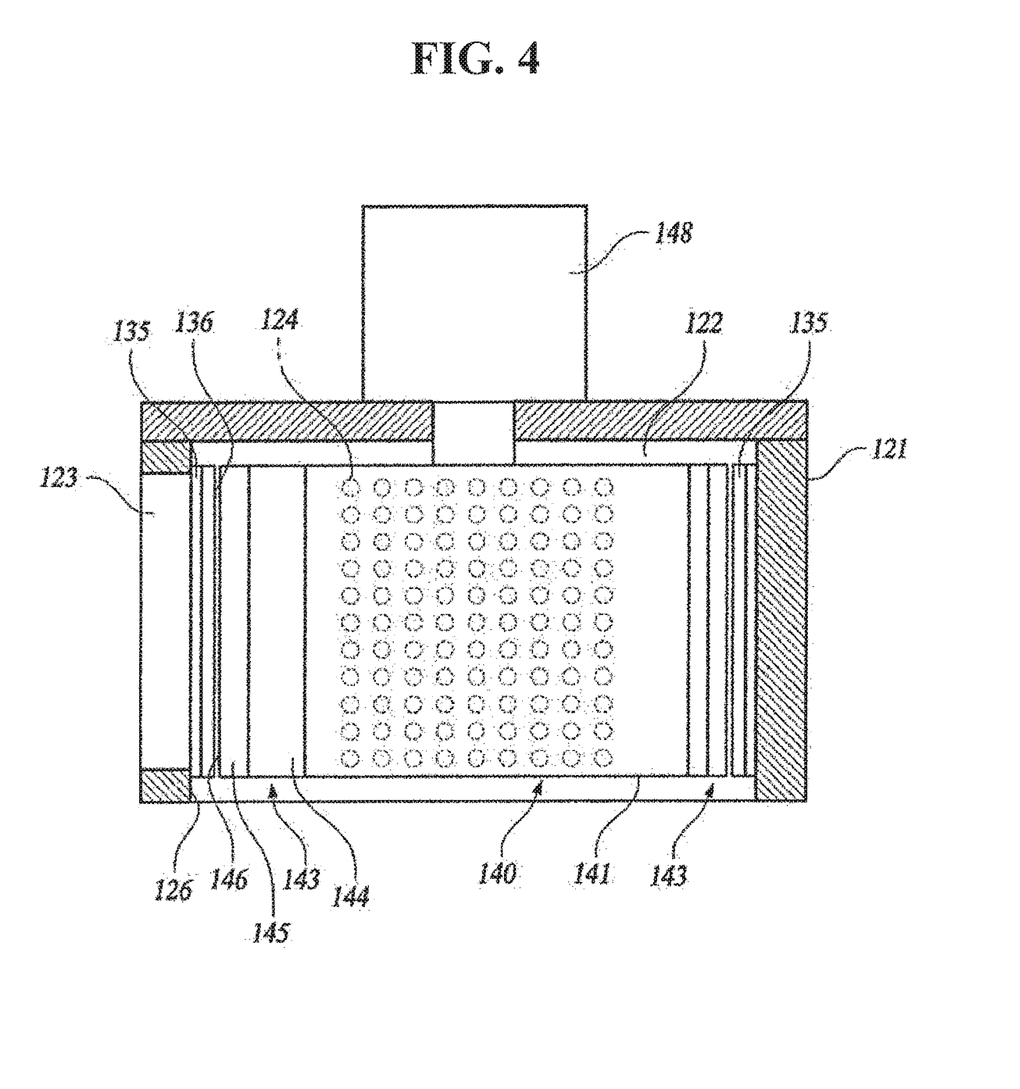
FIG. 4 is a cross-sectional plan view showing a cutting section housing of the glass wool cutting device according to one exemplary embodiment of the present invention.

FIG. 1 is a front view schematically showing a glass wool cutting device according to one exemplary embodiment of the present invention, FIG. 2 shows a part of configuration of the glass wool cutting device according to one exemplary embodiment of the present invention, and FIG. 4 is a cross-sectional plan view showing a cutting section housing of the glass wool cutting device according to one exemplary embodiment of the present invention.

As illustrated in FIGS. 1. 2 and 4, a glass wool cutting device 100 according to one exemplary embodiment of the present invention may include a glass wool compressing section 110 configured to compress a glass wool G, a glass wool conveying section 115 configured to convey the compressed glass wool G, a glass wool cutting section 120 configured to cut the glass wool G, and a glass wool collecting section 152 configured to collect the cut glass wool G. The above-described glass wool cutting device 100 may compress the glass wool G into a mat shape and cut the glass wool G into a glass wool pellet Gp having a size that may be used as a reinforcement material of a composite material.

The glass wool compressing section 110 may compress the glass wool G into a panel form and may include a plurality of compression rollers 111 and 112. The compression rollers 111 and 112 may include a primary compression roller 111 configured to primarily compress the glass wool G and a secondary compression roller 112 configured to secondarily compress the glass wool G. The pair of primary compression rollers 111 may be arranged to face each other and be rotated, and thus the primary compression rollers may compress the glass wool G. Furthermore, the pair of secondary compression rollers 112 may be arranged to face each other and be rotated, and thus the secondary compression rollers may compress the glass wool G to allow the glass wool to have a thickness less than a thickness of the glass wool compressed by the primary compression rollers 111. In addition to a configuration in which the plurality of compression rollers 111, 112 are arranged to face each other, the glass wool compressing section 110 may be modified into various other structures capable of compressing the glass wools G to allow the glass wool to have a density suitable for employing as a reinforcement of a composite material.

The glass wool conveying section 115 may convey the glass wool G compressed in the glass wool compressing section 110 to the glass wool cutting section 120. Accordingly, the glass wool conveying section 115 may include a conveyance guide 116 configured to guide the compressed glass wool G and a conveyance roller 117 rotatably disposed above the conveyance guide 116 to convey the glass wool G along the conveyance guide 116, In addition to the configuration as shown, the glass wool conveying section 115 may be modified into various other structures capable of conveying the glass wool G to the glass wool cutting section 120.

The glass wool cutting section 120 may receive the glass wool G from the glass wool conveying section 115 and may cut the glass wool G. Accordingly, the glass wool cutting section 120 may include a cutting section housing 121 into which the glass wool G is fed, a plurality of stationary knives 135 fixedly mounted on an inner surface of the cutting section housing 121, a movable cutter 140 rotatably disposed inside the cutting section housing 121, and a cutter actuator 148 configured to provide a driving force to the movable cutter 140. In addition, a cutting section chamber 122 may be disposed inside the cutting section housing 121, and the cutting section chamber 122 may be formed to have a circular cylinder shape as shown in the drawings.

Furthermore, a feed port 123 connected to the cutting section chamber 122 may be disposed on a first side of the cutting section housing 121 to enable the glass wool G to be fed into the cutting section housing 121. In addition, a plurality of discharge ports 124 connected to the cutting section chamber 122 may be disposed on a second side of the cutting section housing 121 to discharge the glass wool G which is cut in the cutting section chamber 122. In particular, a size of the discharge port 124, which is a width of the discharge port 124, may be formed to be less than a width of the feed port 123. Accordingly, only the glass wool G having a size equal to or less than a predetermined size among the glass wool G cut in the cutting section chamber 122 may be discharged through the discharge port 124. The discharge port 124 may be disposed at a lower side of the cutting section housing 121 as shown in the drawings to allow the glass wool G cut in the cutting section chamber 122 to be discharged more easily.

Furthermore, an air injecting port 125 may be disposed on the cutting section housing 121 to be connected to the cutting section chamber 122, and thus compressed air may flow into the cutting section chamber 122 via the air injecting port 125. An opening 126 may be formed in a front surface of the cutting section housing 121, and the front surface of the cutting section housing 121 may be opened through the opening 126 to expose the inside of the cutting section housing 121 to the outside. A sealing member 128 may be disposed around the opening 126 provided in the front surface of the cutting section housing 121, and the opening 126 may be opened and closed by a door 130 coupled to the cutting section housing 121. Accordingly, when the door 130 covers the front surface of the cutting section housing 121, the sealing member 128 may abut one surface of the door 130 to seal the opening 126.

In a state of covering the front surface of the cutting section housing 121, the door 130 may be firmly secured to the cutting section housing by a door locking mechanism 132 provided on the cutting section housing 121. Accordingly, the door 130 may be opened as needed, and a user may open the door 130 and perform cleaning or maintenance work for the inside of the cutting section housing 121. In addition to the structure shown in the drawing, such the cutting section housing 121 or the door 130 may be modified to have various other structures.

The glass wool cutting section 120 may include the cutting section housing 121 into which the glass wool G is fed, the plurality of stationary knives 135 fixedly mounted on the inner surface of the cutting section housing 121, the movable cutter 140 rotatably disposed inside the cutting section housing 121, and the cutter actuator 148 configured to provide a driving force to the movable cutter 140. The stationary knives 135 of the glass wool cutting section 120 may be fixedly installed on the inner surface of the cutting section housing 121 to protrude into the cutting section chamber 122, and the plurality of stationary knives 35 may be disposed along the inner surface of the cutting section housing 121 and spaced apart from each other.

Further, the stationary knife 135 may include a stationary knife blade 136 for applying a shearing force to the glass wool G and cutting the glass wool G. The stationary knife blade 136 may be disposed in parallel to a rotational central axis 10 of the movable cutter 140. A distance from the stationary knife blade 136 of each of the plurality of stationary knives 135 to the rotational central axis 10 of the movable cutter 140 may be equal. In other words, the plurality of stationary knives 135 may be disposed to allow each of the stationary knife blades 136 to abut an outer circumference of one imaginary circle centered on the rotational central axis 10 of the movable cutter 140. A specific structure and the number of the stationary knife 135 are not limited to those shown in the drawing and may be variously modified.

The movable cutter 140 may include a rotary support body 141 rotatably disposed in the cutting section chamber 122 and a plurality of movable knives 143 supported on the rotary support body 141. The rotary support body 141 may be rotated by the cutter actuator 148, and the plurality of the movable knives 143 may be disposed around the rotational central axis 10 of the rotary support body 141 at regular intervals. Accordingly, the movable knife 143 may be actuated in response to a rotation of the rotary support body 141 to apply a shearing force together with the stationary knives 135 to the glass wool G fed into the cutting section chamber 122 and cut the glass wool G.

The movable knife 143 may include a movable knife body 144 fixed to the rotary support body 141 and a movable knife tip portion 145 that extends from the movable knife body 144 to be gradually decreased in thickness. A movable knife blade 146 configured to be brought into contact with the glass wool G and to apply a shearing force to the glass wool G may be disposed at one end of the movable knife tip portion 145. In particular, the movable knife blade 146 may be disposed in parallel to the stationary knife blade 136 of the stationary knife 135.

As shown in FIG. 2, the movable knife tip portion 145 may be disposed to be inclined with respect to a turning radius of the rotary support body 141. In other words, the movable knife tip portion 145 may be arranged to be inclined at an acute angle with respect to a tangent line 30 which is in contact with an outer circumference of an imaginary circle 20 centered on the rotational central axis 10 of the rotary support body 141, and the movable knife blade 146 at the end of the movable knife tip portion 145 in the movable knives 143 may be disposed at a front-most end of the rotary support body 141 in a rotational direction. Therefore, when the movable cutter 140 is rotated, the movable knife blade 146 may approach the stationary knife blade 136 of the stationary knife 135 first.

The plurality of movable knives 143 may be arranged to allow each of the movable knife blades 146 to abut an outer circumference of one imaginary circle centered on the rotational central axis 10 of the movable cutter 140, and a distance from each of the movable knife blades 146 of the plurality of movable knives 143 to the rotational central axis 10 of the movable cutter 140 may be equal. In addition to the structure in which three movable knives 143 are disposed on the rotary support body 141 as shown in the drawings, the movable cutter 140 may be modified into various other structures capable of applying a shearing force to the glass wool G and cutting the glass wool G together with the stationary knife 135. Further, the structure of the movable knife 143 is also not limited to the illustrated example, and may be variously modified.

The glass wool cutting section 120 may cut the glass wool G, which enters the cutting section chamber 122 through the feed port 123 of the cutting section housing 121, using the stationary knife 135 and the movable cutter 140. In particular, when the movable cutter 140 receives a driving force from the cutter actuator 148 and is rotated, the stationary knife 135 and the movable knife 143 may act as blades of a pair of scissors to apply a shearing force to the glass wool G. The glass wool G sandwiched between the stationary knife blade 136 of the stationary knife 135 and the movable knife blade 146 of the movable knife 143 may be cut in a moving direction of the movable knife 143.

For this reason, since the plurality of stationary knives 135 and the plurality of movable knives 143 may repeatedly cut the glass wool G as the movable cutter 140 is rotated at a high speed, the glass wool U may be gradually decreased in size within the cutting section chamber 122 and the glass wool U that has been reduced in size to be used as a reinforcement of a composite material may be discharged through the discharge port 124 of the cutting section housing 121.

Meanwhile, when the stationary knife 135 and the movable cutter 140 cut the glass wool G in the cutting section housing 121, an air supplier 150 may be configured to supply compressed air to the inside of the cutting section housing 121 via the air injecting port 125 of the cutting section housing 121. By injecting air into the cutting section chamber 122 via the air injecting port 125, the glass wool G may more actively flow in the cutting section chamber 122, and thus cutting efficiency for the glass wool G may be improved. In addition, by injecting air into the cutting section chamber 122, the glass wool G which has been cut to have an appropriate size may be discharged more smoothly through the discharge port 124.

The glass wool collecting section 152 may be disposed below the cutting section housing 121 to collect the glass wool pellets Up having a predetermined size and obtained by cutting the glass wool in the cutting section housing 121. More specifically, the glass wool collecting section 152 may include a collection container 153 having a collection section chamber 154 that is in communication with the discharge port 124 of the cutting section housing 121, and a filtering sieve 156 installed in the collection section chamber 154 to sort the glass wool G based on the size thereof. The filtering sieve 156 may include a mesh net structure capable of passing the glass wool G which is discharged via the discharge port 124 of the cutting section housing 121 and has a size equal to or less than a predetermined size, and may sort the glass wool pellets Gp.

Further, the filtering sieve 156 may be vibrated by a vibrator 158, and the vibrator 158 may be installed in the collection container 153 to be connected to the filtering sieve 156. Due to the above configuration, when the vibrator 158 vibrates the filtering sieve 156, the glass wool G that tails onto the filtering sieve 156 may be sorted more smoothly and may pass through the filtering sieve 156.

Figure 3:
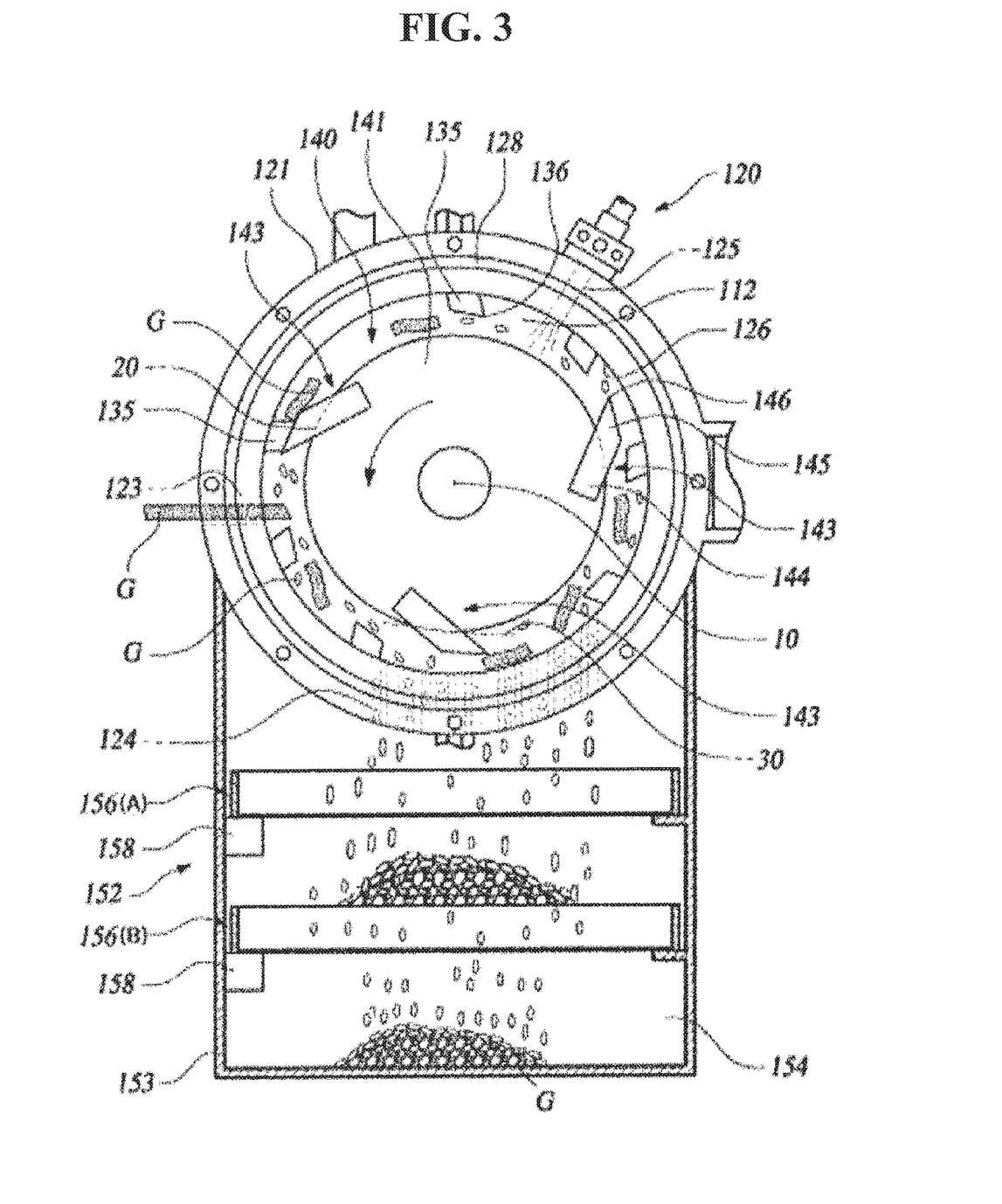

In addition, a plurality of the filter sieves 156 may be provided in the collection section chamber 154. For example, as shown in FIG. 3, a first filtering sieve 156A having a large mesh net structure may be installed at an upper portion and a second filtering sieve 156B having a mesh net structure which is smaller than the mesh net structure of the first filtering sieve 156 may be provided below the first filtering sieve 156A. In this configuration, the first filtering sieve 156A and the second filtering sieve 156B may be vibrated by the vibrator 158. Accordingly, the size of the glass wool pellet Gp obtained by cutting the glass wool G may be further sorted by the first filtering sieve 156A and the second -filtering sieve 156B, and the sorted glass wool pellet may then be collected. The number of the filtering sieves 156 to be installed may be variously increased or decreased based on the size of the glass wool to be sorted or the like.

The glass wool G filtered by the filtering sieve 156 may be re-fed into the cutting section chamber 122 by a worker or by a separate conveyance device and then cut. Accordingly, the glass wool cutting device 100 according to one exemplary embodiment of the present invention may include a manual feeder 160, and the manual feeder 160 may be connected to the cutting section housing 121 to allow a worker to manually feed the glass wool G into the cutting section housing 121 through the manual feeder 160.

In particular, the manual feeder 160 may include a feeding hopper 161 having a hopper feeding port 162 in communication with the cutting section chamber 122 and a hopper opening/closing part 163 coupled to the feeding hopper 161 to open and close the hopper feeding port 162. Accordingly, a worker may open the hopper opening/closing part 163 and manually feed the glass wool G into the cutting section housing 121 through the feeding hopper 161. When the glass wool G is not manually fed, a worker may close the hopper opening/closing part 163 to prevent the glass wool G in the cutting section housing 121 from being discharged to the outside through the hopper feeding port 162.

As described above, in the glass wool cutting device 100 according to one exemplary embodiment of the present invention, by receiving the glass wool G inside the cutting section housing 121 and rotating the movable cutter 140 to apply a shearing force to the glass wool G with the stationary knife 135 and the movable knife 143 of the movable cutter 140, the glass wool G may be cut into the glass wool pellet Gp which may he efficiently employed as a reinforcement of a composite material.

The glass wool pellets Gp manufactured by the above-described glass wool cutting device 100 may be employed as a material for reinforcing physical properties of a thermoplastic resin, for example polypropylene that has been used as a matrix of a composite material. Accordingly, polypropylene may be fed into a pelletizing machine together with the obtained glass wool pellets Gp to manufacture composite material pellets, and composite material pellets manufactured as above may be employed as raw material for various composite material products.

Figure 5:
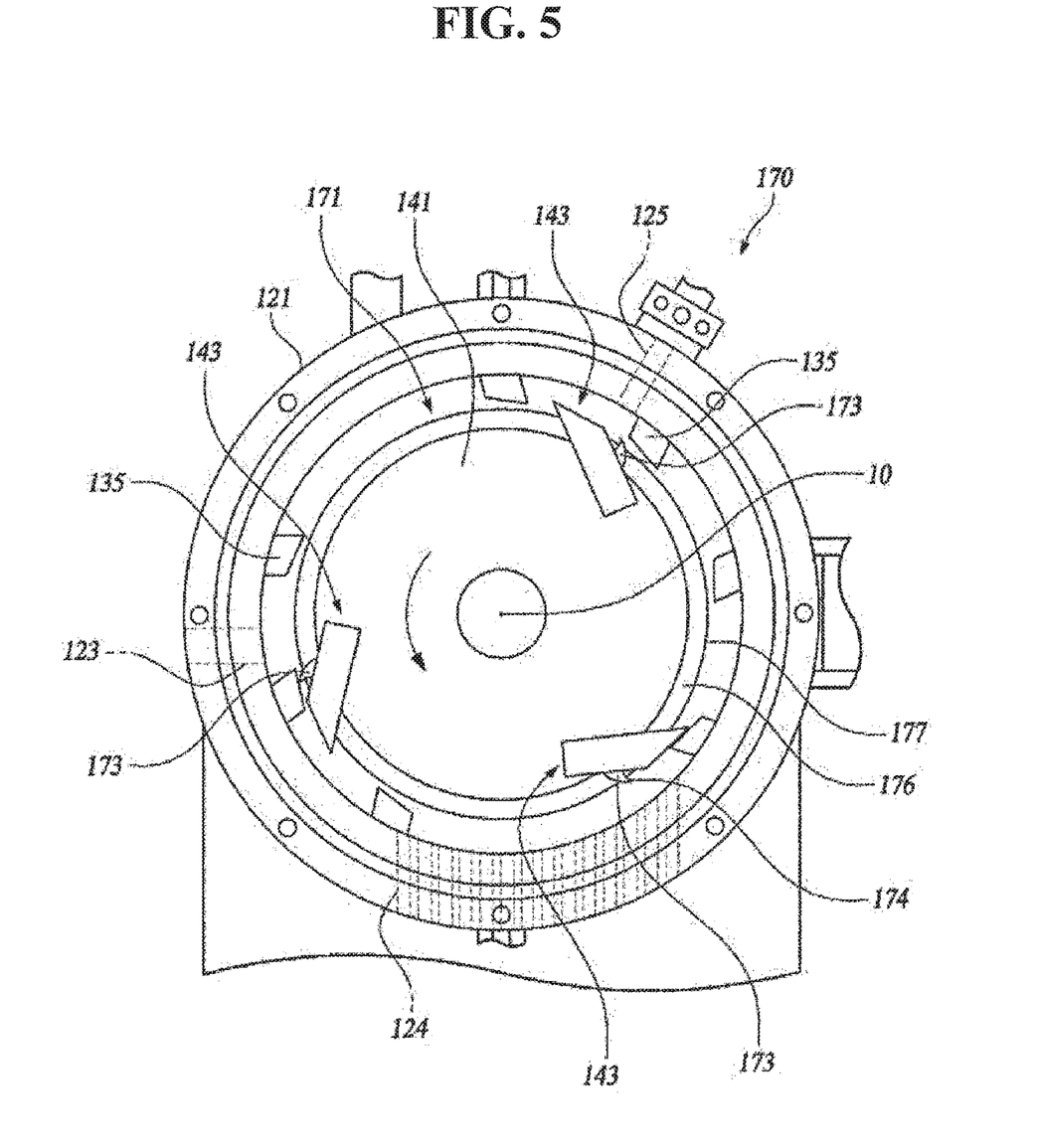
FIG. 5 is a front view showing a modified example of a glass wool cutting section according to one exemplary embodiment of the present invention.
Figure 6:
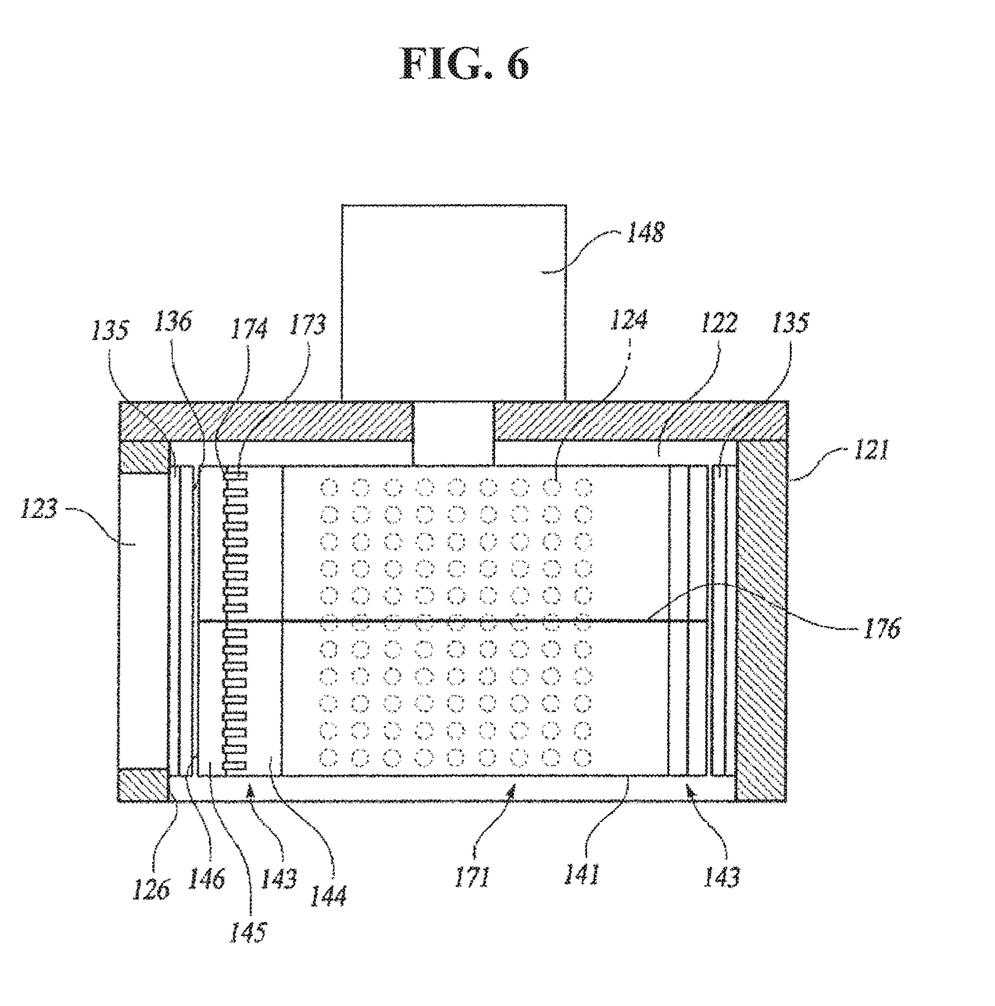
FIG. 6 is a cross-sectional plan view showing a cutting section housing of the glass wool cutting section shown in FIG. 5 according to one exemplary embodiment of the present invention.

FIG. 5 is a front view showing a modified example of the glass wool cutting section, and FIG. 6 is a cross-sectional plan view showing a cutting section housing of the glass wool cutting section shown in FIG. 5. As shown in FIGS. 5 and 6, a glass wool cutting section 170 may include the cutting section housing 121 into which the glass wool G is fed, the plurality of stationary knives 135 fixedly installed on the inner surface of the cutting section housing 121, a movable cutter 171 rotatably disposed inside the cutting section housing 121, and the cutter actuator 148 configured to provide a driving force to the movable cutter 171. The cutting section housing 121 may be similar to that described above, and may include the cutting section chamber 122, the feed port 123 and the discharge port 124. In addition, the stationary knife 135 may be the same as the above-described stationary knife.

The movable cutter 171 may include the rotary support body 141 rotatably disposed in the cutting section chamber 122, the plurality of movable knives 143 supported on the rotary support body 141, a plurality of sub knives 173 disposed on the plurality of movable knives 143, respectively, and a rotary knife 176 coupled to the rotary support body 141. The movable knife 143 and the rotary support body 141 may be the same as the above-described movable knife and rotary support body, respectively, and the movable knife 143 may include the movable knife body 144 and the movable knife tip portion 145 having the movable knife blade 146 at an end thereof.

In particular, the sub knife 173 may include a sub knife blade 174 for applying a shearing force to the glass wool G together with the stationary knife blade 136 of the stationary knife 135 and cutting the glass wool G. The sub knife blade 174 may be smaller than the movable knife blade 146 of the movable knife 143 and may be disposed in parallel to the stationary knife blade 136.

The sub knife 173 may be disposed on the movable knife body 144 of the movable knife 143 to protrude towards the stationary knife 135 to position the sub knife blade 174 behind the movable knife blade 146 in a rotational direction of the rotary support body 141, and the plurality of sub knives 173 may be disposed on one movable knife 143 to be spaced apart from each other in a longitudinal direction of the movable knife blade 146. In particular, the plurality of sub knives 173 may be arranged to allow each movable knife blade 146 to abut an outer circumference of one imaginary circle centered on the rotational central axis 10 of the movable cutter 140. Therefore, a distance from each of the sub knife blades 174 of the plurality of sub knives 173 to the rotational central axis 10 of the movable cutter 140 may be equal.

The rotary knife 176 may be disposed perpendicular to the rotational central axis 10 of the rotary support body 141 in the middle of the rotary support body 141 to cut the glass wool G fed into the cutting section chamber 122, and at least a portion of the rotary knife 176 may be formed into an imaginary circular arc shape centered on the rotational central axis 10 of the rotary support body 14 to protrude from the rotary support body 141 towards the stationary knife 135. Accordingly, the rotary knife 176 may be rotated together with the rotary support body 141 to cut the glass wool G in a direction perpendicular to a cutting direction of the movable knife 143. In other words, the rotary knife 176 may cut the glass wool G in a direction perpendicular to the rotational central axis 10 of the rotary support body 141.

As shown in FIGS. 5 and 6, the rotary knife 176 may be formed into a circular ring shape centered on the rotational central axis 10 of the rotary support body 141. As another example, the rotary knife 176 may have a circular arc shape and be disposed around the rotational central axis 10 of the rotary support body 141. In particular, the plurality of rotary knives 176 may be disposed to be spaced apart from each other around the rotational central axis 10.

The glass wool cutting section 170 may cut the glass wool G, which enters the cutting section chamber 122 through the feed port 123 of the cutting section housing 121, using the stationary knife 135 and the movable cutter 171. When the movable cutter 171 receives a driving force from the cutter actuator 148 and is rotated, the stationary knife 135 and the movable knife 143 may act as blades of a pair of scissors to apply a shearing force to the glass wool G to cut the glass wool in the moving direction of the movable knife 143.

In addition, the plurality of sub knives 173 may be actuated together with the stationary knife 135 to apply a shearing force to the glass wool G, and thus the glass wool G may be cut to a smaller size, Furthermore, the rotary knife 176 may cut the glass wool G in a direction perpendicular to a cutting direction of the movable knife 143 to cut the glass wool G fed into the cutting section housing 121 more rapidly to an appropriate size.

Figure 7:
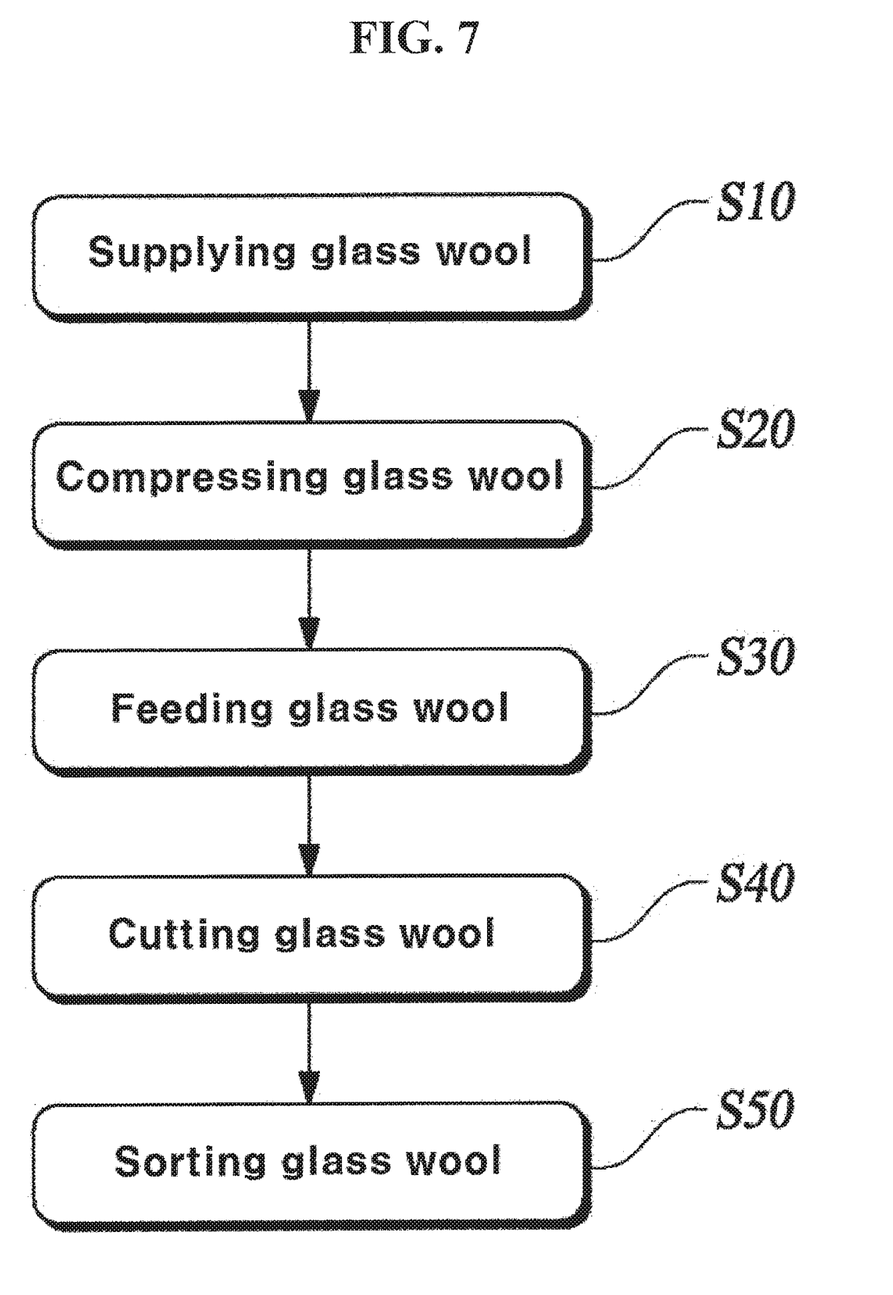
FIG. 7 is a flow chart showing steps of a method for manufacturing a glass wool pellet according to one exemplary embodiment of the present invention.

Hereinafter, a method of manufacturing the glass wool pellet Gp using the above-described glass wool cutting device 100 will be described. Referring to FIG. 7, a method of manufacturing the glass wool pellet according to one exemplary embodiment of the present invention may include a step S10 of supplying the glass wool, a step S20 of compressing the glass wool, a step S30 of feeding the glass wool, a step S40 of cutting the glass wool and a step S50 of sorting the glass wool.

First, the glass wool G manufactured in various forms may be supplied to the glass wool compressing section 110 in the glass wool supplying step S10, and the supplied glass wool G may be compressed into a panel form by the glass wool compressing section 110 in the glass wool compressing step S20. In the glass wool compressing step S20, as described above, the glass wool G may be primarily compressed and then secondarily compressed by means of the plurality of compression rollers 111 and 112.

Further, the glass wool G compressed in the form of the panel may be fed into the cutting section housing 121 in the glass wool feeding step S30. In this step, the glass wool G may be fed into the cutting section chamber 122 of the cutting section housing 121 using the glass wool conveying section 115 and/or the manual feeder 160 as shown in FIG. 1.

In the glass wool cutting step S40, the glass wool G fed into the cutting section chamber 122 may be cut by the stationary knife 135 and the movable knife 143. In this step, a shearing force may be applied to the glass wool G by the movable knife blade 146 of the movable knife 143 and the stationary knife blade 136 of the stationary knife 135 while the movable knife 143 is rotated as shown in FIG. 2, and thus, the glass wool G may be cut to a predetermined size. In addition, as shown in FIG. 5, by using the sub knife 173, which is disposed to protrude towards the stationary knife 135, and the rotary knife 176 together with the stationary knife 135 and the movable knife 143, the efficiency for cutting the glass wool G may be improved.

Furthermore, in the glass wool cutting step S40, the air supplier 150 may be actuated to inject air into the cutting section chamber 122 via the air injecting port 125 of the cutting section housing 121 to allow the glass wool G to flow more actively in the cutting section chamber 122, thereby enhancing the cutting efficiency for the glass wool G. In addition, by injecting air into the cutting section chamber 122, the glass wool pellet Gp obtained by cutting the glass wool to the predetermined size may be more smoothly discharged through the discharge port 124.

In the glass wool sorting step S50, among the glass wools G discharged via the discharge port 124 of the cutting section housing 121 after being cut in the cutting section housing 121, the glass wool having a size equal to or less than a predetermined size may be sorted. At this step, as shown in FIG. 2, the filtering sieve 156 having a mesh net structure and disposed below the cutting section housing 121 may be employed to allow the glass wool G having a size equal to or less than a predetermined size to pass therethrough, and to be sorted as the glass wool pellet Gp.

At this time, sorting efficiency of the filtering sieve 156 may be increased by vibrating the filtering sieve 156 with the vibrator 158. In addition, in the glass wool sorting step S50, as shown in FIG. 3, by sequentially disposing the first filtering sieve 156A having a mesh net structure with a large opening and the second filtering sieve 156B having a mesh net structure with a smaller opening than the mesh net structure of the first filtering sieve 156A below the cutting section housing 121, the glass wool pellets Gp may be sorted. As described above, when the plurality of filtering sieves 156 are employed, the glass wool pellets Gp may be further subdivided and sorted based on the size thereof, and the glass wools G which do not pass through the filtering sieve 156 may be re-fed into the cutting section chamber 122 by a worker or a separate conveyance device and then cut.

In the glass wool cutting device according to the present invention, the glass wool may be housed inside the cutting section housing and the movable cutter may be rotated to apply a shearing force to the glass wool with the stationary knife and the movable knife of the movable cutter, and thus the glass wool may be cut into glass wools having a size that may be employed as a reinforcement of a composite material.

Although the present invention has been shown and described with reference to exemplary embodiments thereof for illustrating a principle of the present invention, the present invention is not limited to the structure and the operation described with reference to the drawings in the above exemplary embodiments, and it will be appreciated by those skilled in the art that numerous changes and modifications of the invention are possible without departing from the spirit and scope defined in the appended claims.

What is claimed is:

1. A glass wool cutting device, comprising:
   a cutting section housing that includes a cutting section chamber, a feed port connected to the cutting section chamber to feed a glass wool into the cutting section chamber, and a discharge port having a size smaller than a size of the feed port and connected to the cutting section chamber to discharge the glass wool from the cutting section chamber;
   a stationary knife fixedly disposed on an inner surface of the cutting section housing to protrude into the cutting section chamber;
a movable cutter having a rotary support body rotatably disposed in the cutting sect ion chamber and a movable knife supported on the rotary support body to apply a shearing force to the glass wool, which is fed into the cutting section chamber, together with the stationary knife and to cut the glass wool; and
   a cutter actuator configured to provide a driving force to the rotary support body,
   wherein the movable knife includes a movable knife body fixed to the rotary support body and a movable knife tip portion that extends from the movable knife body to be gradually decreased in thickness to form a movable knife blade along an end thereof for cutting the glass wool, and
   wherein the movable knife blade and a stationary knife blade provided on the stationary knife for applying a shearing force to the glass wool together with the movable knife blade extend along a rotational central axis direction such that they are disposed in parallel to the rotational central axis of the rotary support body.

2. The glass wool cutting device of claim 1, further comprising:
   an air supplier connected to the cutting section housing to inject air into the cutting section chamber.

3. The glass wool cutting device of claim 1, further comprising:
   a glass wool compressing section configured to compress the glass wool into a panel form using a compression roller and supply the compressed glass wool to the feed port of the cutting section housing.

4. The glass wool cutting device of claim 3, further comprising:
   a feeding hopper connected to the cutting section housing to feed the glass wool into the cutting section chamber, wherein the feeding hopper includes a hopper feeding port in communication with the cutting sect ion chamber; and
   a manual feeder having a hopper opening/closing part coupled to the feeding hopper to open and close the hopper feeding port.

5. The glass wool cutting device of claim 1, further comprising:
   a collection container having a collection section chamber, wherein the collection section chamber is in communication with the discharge port to allow the glass wool, which is cut in the cutting section chamber and discharged from the discharge port of the cutting section housing, to be accommodated therein;
   a filtering sieve disposed on the collection section chamber to allow the glass wool with a size equal to or less than a predetermined size to pass there-through and then sort the glass wool; and
   a vibrator connected to the filtering sieve to vibrate the filtering sieve.

6. The glass wool cutting device of claim 5, wherein a plurality of filtering sieves are disposed on the collection section chamber, and a mesh net structure of an upper filtering sieve has a larger opening than a mesh net structure of a lower filtering sieve.

7. The glass wool cutting device of claim 1,
   wherein the movable knife tip portion is arranged to be inclined with respect to a tangent line, which abuts an outer circumference of an imaginary circle centered on a rotational central axis of the rotary support body to allow the movable knife blade to be disposed at a front-most end of the rotary support body in a rotational direction.

8. The glass wool cutting device of claim 1, further comprising:
   a sub knife having a sub knife blade disposed in parallel to the stationary knife blade to apply a shearing force to the glass wool together with the stationary knife blade and to cut the glass wool,
   wherein the sub knife protrudes from the movable knife towards the stationary knife to allow the sub knife blade to be positioned behind the movable knife blade in the rotational direct ion of the rotary support body.

9. The glass wool cutting device of claim 1, further comprising:
   a rotary knife having an imaginary circular arc shape formed at least a portion thereof and centered on the rotational central axis of the rotary support body to protrude from the rotary support body towards the stationary knife to cut the glass wool fed into the cutting section chamber.

10. A method for manufacturing a glass wool pellet, comprising:
    feeding a glass wool into a cutting section housing that includes a cutting section chamber and a discharge port;
    applying a shearing force to and cutting the glass wool fed into the cutting section chamber with a stationary knife, which is disposed and protrudes on an inner surface of the cutting section housing, and a movable knife white rotating the movable knife disposed in the cutting section chamber; and
    sorting the glass wool having a size equal to or less than a predetermined size, which are cut and discharged from the discharge port, as a glass wool pellet,
    wherein the movable knife includes a movable knife body fixed to the rotary support body and a movable knife tip portion that extends from the movable knife body to be gradually decreased in thickness to form a movable knife blade alone end thereof for cutting the glass wool, and
    wherein the movable knife blade and a stationary knife blade provided on the stationary knife to apply a shearing force to the glass wool together with the movable knife blade extend along a rotational central axis direction such that they are disposed in parallel to the rotational central axis of the rotary support body.

11. The method for manufacturing a glass wool pellet of claim 10, comprising compressing the glass wool into a panel form prior to feeding the glass wool into the cutting section, wherein the glass wool compressed into the panel form is fed into the cutting section housing.

12. The method for manufacturing a glass wool pellet of claim 10, wherein the glass wool is cut while air is injected into the cutting section chamber by an air supplier connected to the cutting section housing.

13. The method for manufacturing a glass wool pellet of claim 10, wherein a filtering sieve disposed below the cutting section housing is vibrated to allow the glass wool that has the size equal to or less than the predetermined size, discharged from the discharge port to pass through the filtering sieve and to be sorted as the glass wool pellet.

14. The method for manufacturing a glass wool pellet of claim 13, wherein a plurality of filtering sieves are sequentially disposed below the cutting section housing, and a mesh net structure of an upper filtering sieve has a larger opening than a mesh net structure of a lower filtering sieve to sort the glass wool pellet.

15. The method for manufacturing a glass wool pellet of claim 10,
wherein the movable knife includes a movable knife body fixed to the rotary support body and a movable knife tip portion that extends from the movable knife body to be gradually decreased in thickness and to form a movable knife blade at one end thereof, and
wherein the stationary knife includes a stationary knife blade disposed in parallel to a rotational central axis of the rotary support body, and the shearing force is applied to the glass wool with the movable knife blade and the stationary knife blade to cut the glass wool.

16. The method for manufacturing a glass wool pellet at claim 15, wherein a sub knife having a sub knife blade disposed in parallel to the stationary knife blade to apply a shearing force to the glass wool together with the stationary knife blade is disposed on the movable knife to protrude towards the stationary knife, and the shearing force is applied to the glass wool with the movable knife blade, the stationary knife blade and the sub knife blade to cut the glass wool.

17. The method for manufacturing a glass wool pellet of claim 15, wherein a rotary knife having an imaginary circular arc shape formed on at least a portion thereof and centered on the rotational central axis of the rotary support body to protrude towards the stationary knife is disposed on the rotary support body, and the shearing force is applied to the glass wool with the movable knife blade, the stationary knife blade and the rotary knife to cut the glass wool.

18. A glass wool cutting device, comprising:
a cutting section housing that includes a cutting section chamber, a feed port connected to the cutting section chamber to feed a glass wool into the cutting section chamber, and a discharge port having a size smaller than a size of the feed port and connected to the cutting section chamber to discharge the glass wool from the cutting section chamber;
a stationary knife fixedly disposed on an inner surface of the cutting section housing to protrude into the cutting section chamber;
a movable cutter having a rotary support body rotatably disposed in the cutting sect ion chamber and a movable knife supported on the rotary support body to apply a shearing force to the glass wool, which is fed into the cutting section chamber, together with the stationary knife and to cut the glass wool; and
a cutter actuator configured to provide a driving force to the rotary support body, wherein the movable knife includes a movable knife body fixed to the rotary support body and a movable knife tip portion that extends from the movable knife body to be gradually decreased in thickness to form a movable knife blade alone end thereof for cutting the glass wool, and wherein the movable knife blade and a stationary knife blade provided on the stationary knife to apply a shearing force to the glass wool together with the movable knife blade extend along a rotational central axis direction such that they are disposed in parallel to the rotational central axis of the rotary support body,
wherein the glass wool cutting device further comprises a sub knife having a sub knife blade disposed in parallel to the stationary knife blade to apply a shearing force to the glass wool together with the stationary knife blade and to cut the glass wool.

* * * * *